United States Patent [19]
Kane

[11] 4,168,933
[45] Sep. 25, 1979

[54] CONVERTIBLE MULTI-PURPOSE TRAILER

[76] Inventor: Larry G. Kane, 378 E. 16th St., Greeley, Colo. 80631

[21] Appl. No.: 867,075

[22] Filed: Jan. 5, 1978

[51] Int. Cl.² .............................. B60P 3/04; B60P 3/42
[52] U.S. Cl. .................................... 414/498; 119/11; 296/12; 296/24 C; 296/35 A
[58] Field of Search ........... 296/10, 12, 23 MC, 23 A, 296/23 E, 24 C, 26, 35 A; 214/515, 512, 38 C, 38 CC, 38 D, 152; 105/366 R; 119/8, 10, 11, 18

[56] References Cited

U.S. PATENT DOCUMENTS

| | | | |
|---|---|---|---|
| 2,328,971 | 9/1943 | Fraley | 296/10 |
| 2,825,301 | 3/1958 | Quist | 296/24 C |
| 3,524,659 | 8/1970 | Filter | 296/10 |
| 3,692,349 | 9/1972 | Ehrlich | 296/28 M |
| 3,703,244 | 11/1972 | Walsh et al. | 296/10 |
| 3,722,721 | 3/1973 | Bennett | 214/515 |
| 3,722,948 | 3/1973 | Walsh et al. | 296/35 A |
| 3,883,020 | 5/1975 | Dehn | 296/35 A |
| 3,923,335 | 12/1975 | Erickson | 296/23 A |

FOREIGN PATENT DOCUMENTS

| | | | |
|---|---|---|---|
| 153373 | 5/1952 | Australia | 296/24 C |
| 2127814 | 12/1972 | Fed. Rep. of Germany | 214/515 |

Primary Examiner—David M. Mitchell
Attorney, Agent, or Firm—Sheridan, Ross, Fields & McIntosh

[57] ABSTRACT

The trailer comprises a transport base with road wheels and a floor on which is mounted an elongate shell having side walls and a roof, the planform of the shell corresponding to the planform of the base. Separate, removable fasteners connect the shell to the base. Jacks are connected to the aft end of the shell to raise it out of contact with the base when the fasteners have been removed. Extensible rollers at the forward end of the shell are lowered to contact the floor of the base. The base can then be moved forward to remove it from under the shell so that it can be used as an open flat bed trailer. Other jacks are connected to a forward portion of the shell, to support the shell when not in use. An assemblage of partitioning components is provided to provide compartments for transporting a pair of horses and is removable to provide an open cargo space when needed.

9 Claims, 16 Drawing Figures

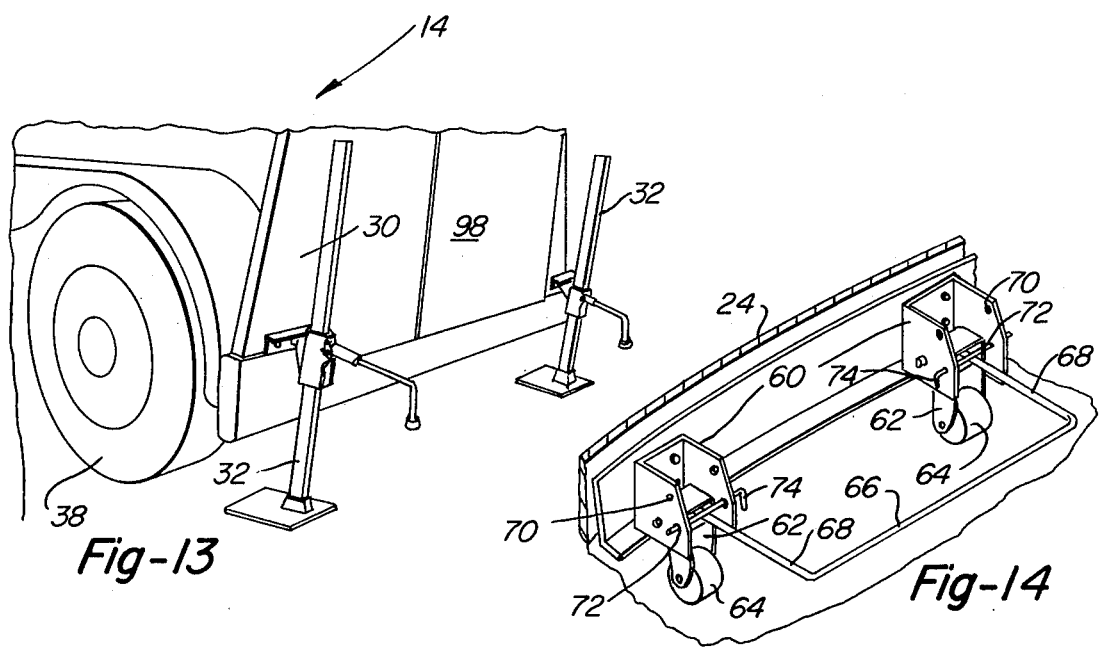
Fig-13
Fig-14
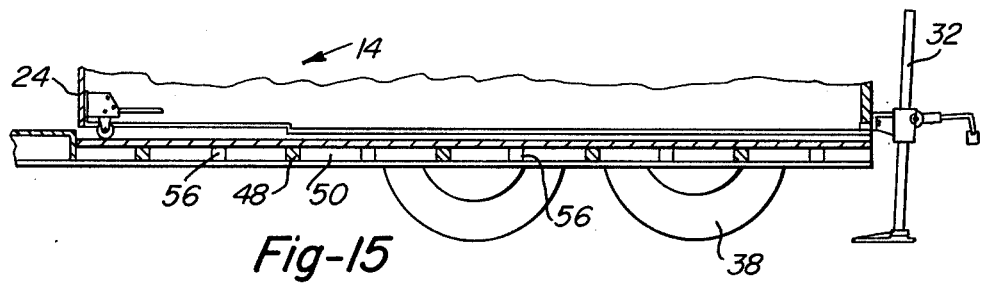
Fig-15
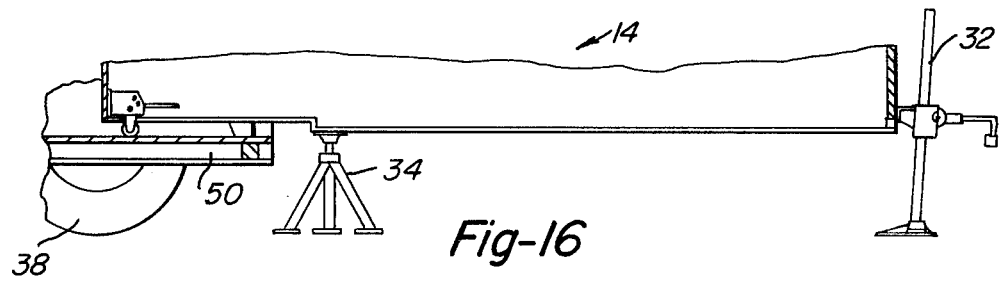
Fig-16

CONVERTIBLE MULTI-PURPOSE TRAILER

BACKGROUND OF THE INVENTION

This invention lies in the field of convertible trailers and is directed to a trailer which can be modified for use in several fields. It is particularly directed to a trailer in which means are provided for transporting horses, or internal paritions can be removed for transporting general cargo, or the enclosure can be removed to produce a flat bed trailer for general utility.

Innumerable types of trailers have been proposed and produced for use in many ways. Some have been designed to be used in open or closed condition. Some have been designed to be extended laterally or longitudinally to increase their utility during camping. Many types of camper bodies have been proposed for mounting on the bed of a truck, with means for supporting them when the truck is withdrawn. However, so far as is known, none has been designed to serve as an enclosed trailer for one or more purposes and as an open flat bed trailer for still other purposes.

PRIOR ART STATEMENT

The following references are submitted under the provisions of 37 CFR 1.97(b) and are the most pertinent references known by the applicant:
U.S. Pat. No. 2,825,301—Quist
U.S. Pat. No. 2,995,398—Davenport
U.S. Pat. No. 3,741,529—Blagg
U.S. Pat. No. 3,980,313—Meinecke Quist shows a one horse trailer having doors in the front portion of the trailer.

Davenport shows a trailer having inner and outer enclosures in telescoping relation, with the inner enclosure extensible from the outer enclosure to increase the total area of the trailer.

Blagg shows a horse trailer with a partition which may be removed, unfolded, and set up as a small corral to allow one or two horses to get exercise and fresh air.

Meinecke shows a camper body provided with wheels at its aft end to support the load, mounted on the bed of a pickup truck and removable therefrom to free the truck for travel. Jacks are provided to support the camper body when it is separated from the truck.

None of these proposals provides a trailer assembly which can be used for a variety of purposes and which can be separated so that one component can be used as a flat bed trailer of general utility.

BRIEF DESCRIPTION OF THE DRAWINGS

Various other advantages and features of novelty will become apparent as the description proceeds in conjunction with the accompanying drawings, in which:

FIG. 13 is a perspective view of the jacking means at the aft end of the shell;

FIG. 14 is a perspective view of the roller means in latched down extended position;

FIG. 15 is a side elevational view, partly in section, of the shell in normal position on the base; and FIG. 16 is a side elevational view, partly in section, of the shell in ground supported position, just prior to final removal of the base.

DESCRIPTION OF PREFERRED EMBODIMENTS

Figure 1:
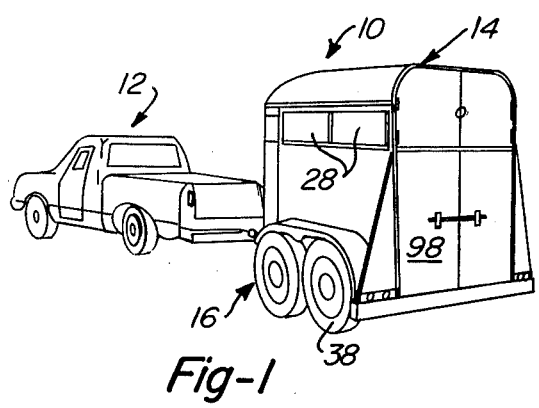
FIG. 1 is a rear perspective view of the complete trailer assembly connected to a towing vehicle.
Figure 2:
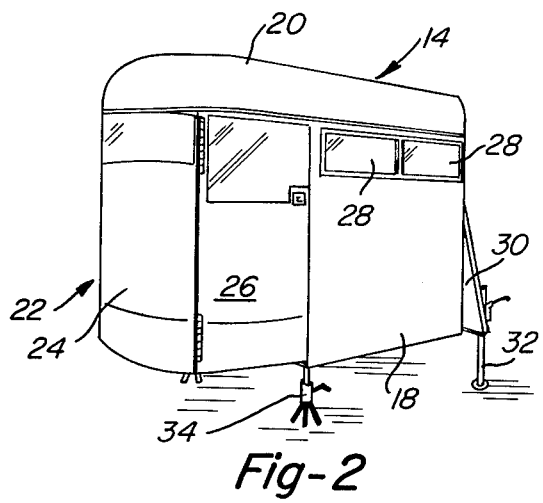
FIG. 2 is a front perspective view of the shell supported on the ground.

The apparatus incorporating the invention is schematically illustrated in FIG. 1, in which a complete trailer assembly 10 is connected to and towed by a vehicle 12. The assembly is made up of an elongate shell 14 and a wheel mounted transport base 16. The shell includes upstanding substantially vertical side walls 18, a roof 20, and a forward end 22 which includes a nose panel 24 and forwardly opening doors 26. Windows 28 are provided in the side panels. The shell is bottomless, i.e., completely open at the lower side. Triangular wings 30 extend laterally from the rear corners of the shell and serve as anchorages for rear jacks 32. The forward jacks 34 may be connected to the side walls at their forward lower corners. Since the shell is bottomless, at least the vertical walls consist of heavy plywood panels with layers of fiberglass bonded to each side for strength and rigidity.

Figure 4:
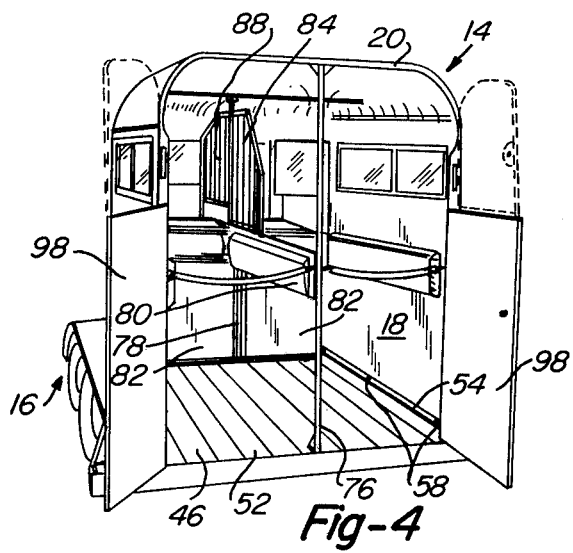
FIG. 4 is a rear perspective view of the trailer with the rear doors opened to show the horse carrying configuration.
Figure 3:
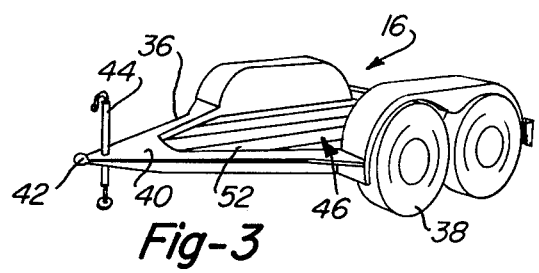
FIG. 3 is a front perspective view of the transport base alone in its open flat bed configuration.

The transport base 16 includes an elongate frame 36 provided with road wheels 38 at each side, a nose portion 40 carrying a hitch connector 42 and a balancing jack 44, and a reinforced floor 46 fixedly mounted on frame 36. Turning to FIGS. 4 and 15, it will be seen that a plurality of heavy beams 48 extend laterally between the side members 50 of frame 36, and that floor 46 is made up of boards or planks 52 lying on the beams 48 and extend longitudinally of the frame in side by side relation. Thus, the floor is extremely strong to carry heavy loads.

Figure 9:
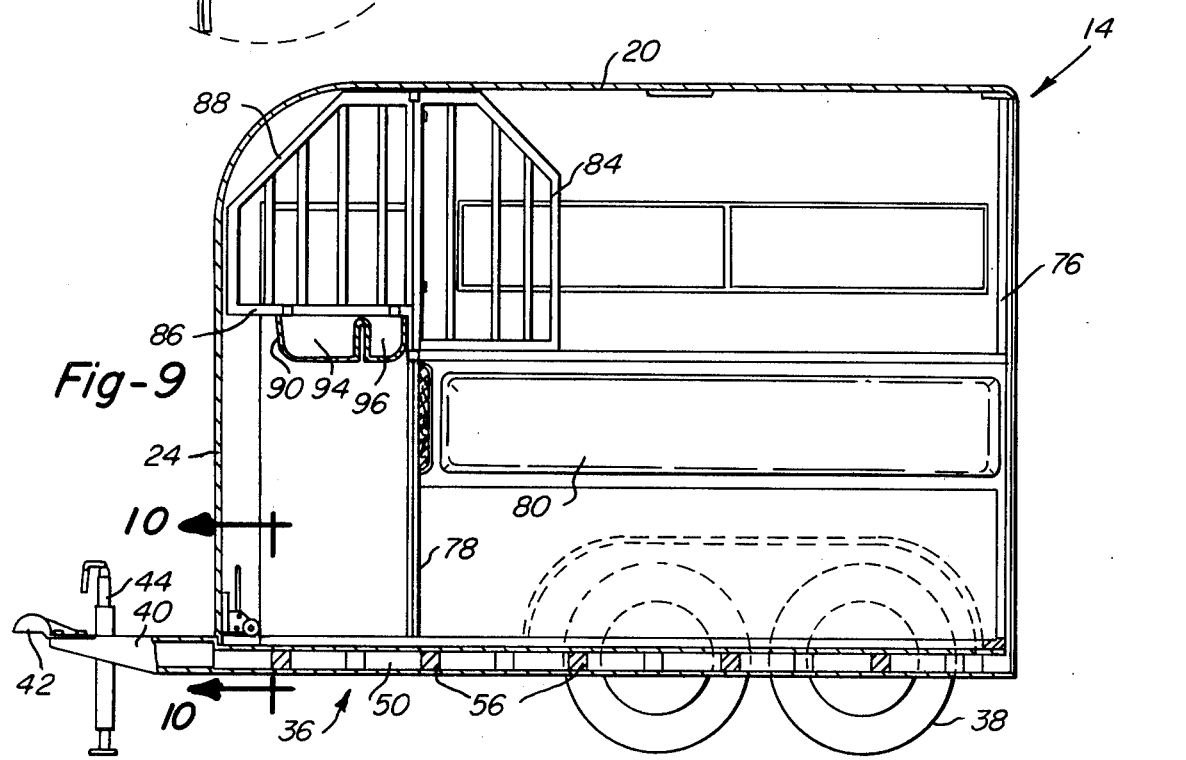
FIG. 9 is a sectional view taken on line 9—9 of FIG. 7.

In order that the floor 46 of the base may serve as the floor of the shell when the components are assembled, the shell is configured to have a planform corresponding to the planform of the frame. The shell is provided with a reinforcing margin 54 along its lower edge overlying the side members 50 of the frame. A plurality of internally threaded fasteners 56, preferably eight in number, are anchored to the side members 50 as best seen in FIGS. 9 and 15 in longitudinally spaced relation. A similar member of apertures 58 are formed in margin 54 in registry with the fasteners 56. When the shell is set down on the base, a bolt, (not shown), is inserted in each aperture and threaded into the corresponding fastener to lock the two components together.

When it is desired to use the base separately, the bolts are removed and jacks 32 are connected to the aft end of the shell and actuated until the aft end is raised a few inches. The shell is then free of the base throughout its length except for its forward end. A pair of rollers mounted in parallel with a handle is lowered so that the forward portion of the shell is supported by the rollers on the floor of the base. The base is pulled forward until only the forward end of the shell overlies the aft end of the base. Jacks 34 are then put in place and actuated to support the forward end of the shell free of the base. The base is then pulled forward still further until it is completely clear of the shell and is ready to serve as an open flat bed trailer to haul loads of any kind. Since the floor is so heavily reinforced, the base is capable of transporting loads of as much as 6,000 pounds or three tons. To recombine the components it is only necessary to reverse the steps set forth above.

Figures 10, 11, 12:
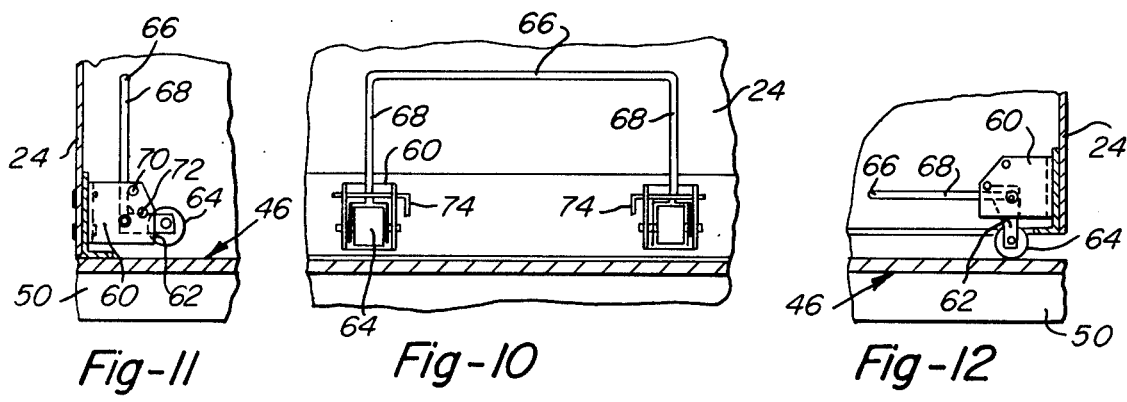
FIG. 10 is a sectional view taken on line 10—10 of FIG. 9.
FIG. 11 is a side elevational view of the roller means in retracted position.
FIG. 12 is a side elevational view of the roller means in extended position.

A pair of rollers as mentioned above, are provided at the forward end of the shell. A first pair of U-shaped brackets 60 are mounted on the inner face of the lower end of nose panel 24 in laterally spaced relation and a second pair of brackets 62 are pivotally mounted one within each of the first brackets. A roller 64 is rotatably mounted in the end of each of the second brackets and a U-shaped operating lever 66 extends across between the second brackets with its arms 68 welded or otherwise fixedly secured to each of them. The lever is so arranged that when it is swung down to the positions shown in FIGS. 12 and 14, the rollers are swung down to their extended positions contacting floor 46 and raising the nose panel above the floor. When the lever is swung up to the position of FIGS. 10 and 11 the rollers are swung up to their retracted position and the nose panel lies solidly on the floor. Upper and lower latching apertures 70 and 72 are formed in each arm of each bracket 60. When the lever 66 is swung down to extended position as shown in FIG. 14, a latch pin 74 is passed through each pair of apertures 72 and overlies arms 68 so that the rollers 64 will be positively held in shell raising position. When lever 66 is retracted, pins 74 are passed through apertures 70 to overlie arms 68 and latch them in vertical or retracted position as shown in FIG. 11.

In order to outfit the assembly to house and transport at least two horses, a plurality of partitioning components is provided. A first stanchion 76 is mounted on the longitudinal centerline of the trailer at its aft end and extends vertically from top to bottom of the shell. A second stanchion 78, also on the centerline, extends from top to bottom of the shell at a location spaced well forward of the mid point of the length of the trailer and is laterally aligned with the forward ends of the straight side walls 18. Both of the stanchions are detachably connected by sockets and bolts to the roof of the shell and the floor of the base.

A longitudinal partition 80 extends between the two stanchions with its upper margin above the midpoint of their heights. A pair of partitions 82 extend from the second or forward stanchion to the side walls of the shell and from about the mid point of the stanchion height to the floor.

Figure 5:
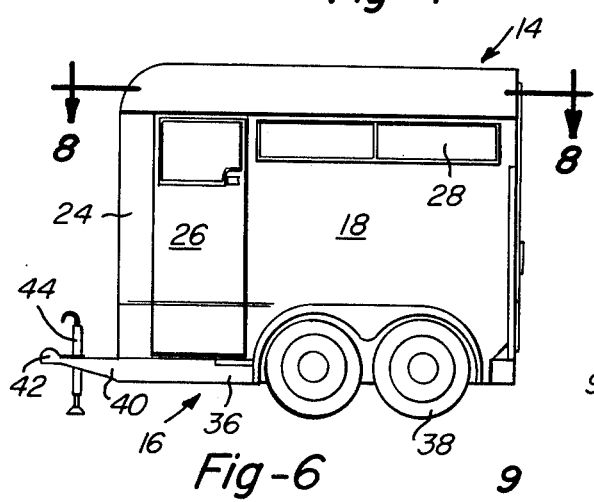
FIG. 5 is a rear perspective view of the trailer with the rear doors opened to show the cargo configuration.
Figure 6:
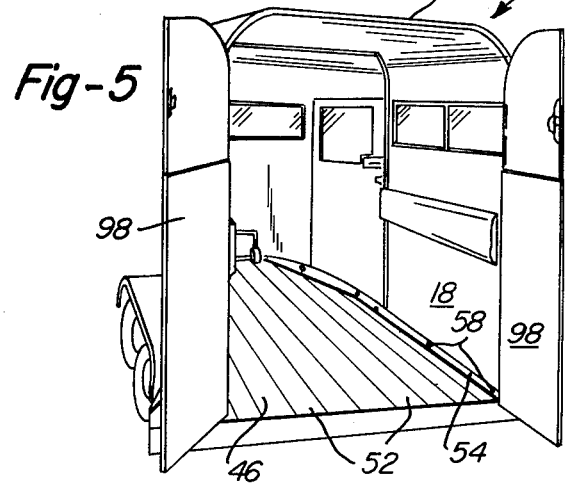
FIG. 6 is a side elevational view of the trailer.
Figure 7:
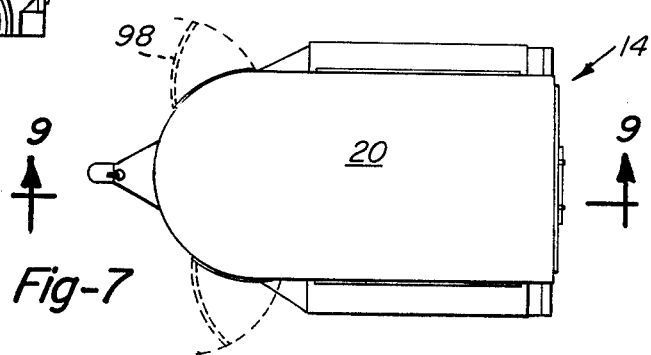
FIG. 7 is a top plan view of the trailer.
Figure 8:
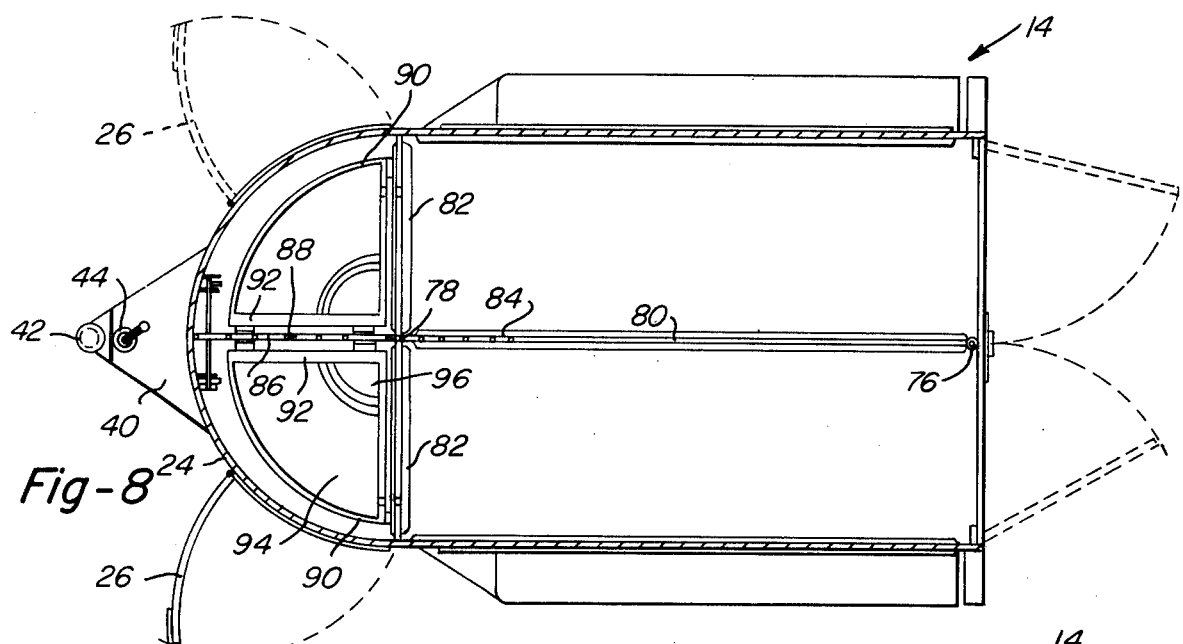
FIG. 8 is a sectional view taken on line 8—8 of FIG. 6.

A short partition section 84 is secured to and carried by the forward portion of partition 80 and extends upward into proximity with the roof 20 to serve as a barrier between the shoulders of the two horses. A beam 86 is attached to and extends forward from stanchion 78 to the forward end of the shell and is located about midway of the height of the stanchion. Another short partition section 88 is secured to beam 86 and extends upward into proximity with the roof 20 to serve as a barrier between the heads of the two horses. Since all of the components are quickly detachable from each other and from the trailer they can be removed in a matter of minutes to convert the trailer from the configuration of FIG. 4 to the open configuration of FIG. 5. It will be seen that the latter is now ready for use to transport general cargo, and can carry such items as motorcycles, farm machinery, etc. in safety and protected from the weather.

A quarter-circular feed pan 90 is pivotally mounted on beam 86 along a longitudinal hinge line 92 at each side of the centerline. These pans are retained in their upper position by slide latches, not shown, and may readily be lowered when not in use. Each pan is divided into a large section 94 to hold grain or hay and a small section 96 to hold water.

Arcuate doors 26 at the forward end of the trailer are hingedly mounted on the nose panel 24 and may be swung forward as shown to provide access to the feed pans. They may also be used as an exit for an attendant who leads a horse into the trailer stall. Doors 98 pivotally mounted on the aft ends of the side walls complete the enclosure.

While an improved convertible trailer has been shown and described in detail it is obvious that this invention is not to be considered to be limited to the exact form disclosed, and that changes in detail and construction may be made in the invention without departing from the spirit thereof.

What is claimed is:

1. A convertible multi-purpose trailer comprising:
   a transport base having an elongate frame provided with road wheels at each side, a hitch connector means at the forward end, and a reinforced floor fixedly mounted on the frame;
   an elongate shell having substantially vertical side walls and an enclosing roof and having a planform corresponding to the planform of the frame;
   separable fasteners to selectively connect the shell to the base and disconnect it therefrom;
   a first pair of brackets secured to the inner face of the forward end of the shell in laterally spaced relation;
   a second pair of brackets pivotally mounted one within each of the first brackets;
   a roller rotatably mounted to each of the second brackets to swing down to an extended position to hold the forward portion of the shell raised and out of contact with the transport base during removal and replacement and to swing up to retracted position to permit re-connection of the shell to the base;
   an operating lever extending across and connected to each of the second brackets and movable to extend and retract the rollers;
   latch means to maintain the rollers selectively in extended or retracted position;
   jacks connectable to the aft end of the shell to raise it out of contact with the base;
   the base being movable to remove it from under the shell to serve as an open flat bed trailer;
   and jacks connectable to a forward portion of the shell to support it in the absence of the base.

2. A trailer as claimed in claim 1; in which
   the shell is bottomless;
   and the floor of the base constitutes the floor of the complete trailer assembly.

3. A trailer as claimed in claim 1; in which
   a plurality of heavy supporting beams extend laterally across the base and are connected to the side members of the frame;

and a plurality of boards are laid across the beams and extend longitudinally of the frame in side by side relation in order to support and carry heavy loads.

4. A trailer as claimed in claim 1; in which
the side walls of the shell consist of panels of plywood with layers of fiberglass bonded to each side of each panel.

5. A trailer as claimed in claim 1; in which
a plurality of internally threaded fastener members are anchored to a longitudinal margin of the base in longitudinally spaced relation;
a plurality of apertures are formed in a lower longitudinal margin of the shell in registry with the fastener members;
and a plurality of bolts are provided to pass through the apertures in the shell and engage in the fastener members on the base.

6. A convertible multi-purpose trailer having a plurality of removable partitioning components to subdivide the trailer into compartments to house a plurality of horses, said trailer comprising:
a transport base having an elongate frame provided with road wheels at each side, a hitch connector means at the forward end, and a reinforced floor fixedly mounted on the frame;
an elongate shell having substantially vertical side walls and an enclosing roof and having a planform corresponding to the planform of the frame;
separable fasteners to selectively connect the shell to the base and disconnect it therefrom;
a first stanchion extending vertically from top to bottom of the shell at the longitudinal centerline of the trailer and detachably secured to the floor of the base and to the roof of the shell at the aft end of the trailer;
a second stanchion extending vertically from top to bottom of the shell at the longitudinal centerline of the trailer and detachably secured to the floor of the base and to the roof of the shell at a location spaced well forward of the mid point of the length of the trailer;
a removable longitudinal partition extending between the stanchions and detachably connected thereto about midway of their heights;
a pair of removable lateral partitions extending from the forward stanchion to the side walls of the shell;
a short removable partition section carried by the forward portion of the longitudinal partition and removably extending upward to the top of the shell;
a removable beam extending from the forward stanchion to the forward end of the shell;
a front removable partition section carried by the beam and extending upward to the top of the shell to serve as a barrier between the heads of two of the horses;
jacks connectable to the aft end of the shell to raise it out of contact with the base;
the base being movable forward to remove it from under the shell to serve as an open flat bed trailer; and
jacks connectable to a forward portion of the shell to support it in the absence of the base.

7. A trailer as claimed in claim 6; in which
at least one feed pan is mounted on the beam extending from the forward stanchion.

8. A trailer as claimed in claim 7; in which
a feed pan extends laterally from the beam toward each side wall of the shell.

9. A trailer as claimed in claim 8; in which
each feed pan is pivotally mounted to the beam along a longitudinally extending hinge line to swing down to inoperative position.

* * * * *